United States Patent [19]

Stradley

[11] 4,146,525

[45] Mar. 27, 1979

[54] HIGH STRENGTH CERAMIC-POLYMER COMPOSITES

[75] Inventor: Norman H. Stradley, Stillwater, Minn.

[73] Assignee: Minnesota Mining and Manufacturing Company, St. Paul, Minn.

[21] Appl. No.: 807,893

[22] Filed: Jun. 20, 1977

[51] Int. Cl.$^2$ ............................................. C08L 63/02
[52] U.S. Cl. ........................... 260/29.2 EP; 260/37 EP
[58] Field of Search ................... 260/29.2 EP, 37 EP; 106/71

[56] References Cited

U.S. PATENT DOCUMENTS

| | | | |
|---|---|---|---|
| 2,288,047 | 6/1942 | Sullivan et al. | 260/38 X |
| 3,242,131 | 3/1966 | Beerman | 260/37 EP |
| 3,288,747 | 11/1966 | Sussman | 260/37 EP |
| 3,484,398 | 12/1969 | Childs | 260/37 EP |
| 3,772,228 | 11/1973 | Allen | 260/29.2 EP X |
| 3,817,897 | 6/1974 | Dill | 260/29.6 R X |
| 3,988,279 | 10/1976 | Klassen | 260/29.2 EP |

FOREIGN PATENT DOCUMENTS

| | | | |
|---|---|---|---|
| 1011515 | 12/1965 | United Kingdom | 260/37 EP |
| 1033514 | 6/1966 | United Kingdom | 260/37 EP |

*Primary Examiner*—Lewis T. Jacobs
*Attorney, Agent, or Firm*—Cruzan Alexander; Donald M. Sell; Edward T. Okubo

[57] ABSTRACT

A composite material having solid ingredients of finely divided ceramic powders and about 5 to 25% by weight (10 to 42 by volume) of finely divided powdered polymer such as an epoxy resin. Shaped articles can be formed using standard ceramic formulation practices while providing the advantage of very low temperature firing to fuse the articles into high strength solids.

4 Claims, No Drawings

HIGH STRENGTH CERAMIC-POLYMER COMPOSITES

BACKGROUND OF THE INVENTION

This invention relates to compositions which are used to produce high-strength ceramic/polymer composite shaped articles and to methods of producing shaped articles from those compositions.

Prior workers have devised procedures for making shaped articles from ceramic and polymer powders. For instance, clay compositions have been mixed with thermosetting resins such as phenolic and thermoplastic resins such as polyethylene and formed into shapes by conventional ceramic forming techniques such as slip casting and throwing on a potter's wheel. However, the strength properties of these articles have left much to be desired.

The present invention relates to a composition comprising about 15 to 35 wt.% (25 to 55 vol.%) aqueous phase and 65 to 85 wt.% (45 to 75 vol.%) solids, wherein the solids comprise about 5 to 25 wt.% (10 to 42 vol.%) on solids basis of finely divided epoxy resin powder and about 75 to 95 wt.% (58 to 90 vol.%) of finely divided ceramic powder. Using standard ceramic formulation practices for the above composition range, shaped articles can be made from slip and modeling clay. In any of these processes, the water remaining after the forming operation is allowed to evaporate through drying and the articles are permanently hardened by firing at low temperatures, for example, 150°–200° C. High strength articles are obtained by all forming processes. Of particular importance is that the compositions of the present invention may be made into a slip or modeling clay and the working and forming characteristics are equivalent to polymer-free ceramic compositions which are fired at high temperatures to obtain high strengths. Nor are the compositions limited to the above forming processes. For example, extruded shapes can be formed by forcing material, which contains about 15% moisture, through a die.

J. D. Sullivan and C. R. Austin, U.S. Pat. No. 2,288,047, issued June 30, 1942, describes slip cast ceramic bodies containing a major portion of plastic clay and 1 to 20 weight percent of a thermoset or thermoplastic resin, preferably 5 to 20 weight percent. The patentees indicate that equal flexural strengths can be obtained by using either a thermoplastic or thermosetting resin.

D. W. Dill, U.S. Pat. No. 3,817,897, issued June 18, 1974, describes a moist modeling clay composition consisting of water and a mixture of 75% to 90% by weight, based on dry ingredients, of a pottery clay and from 10% to 25% by weight of a powdered polymer selected from a group of high and low density polyethylenes, polypropylene, and ethylene vinyl acetate copolymer.

SUMMARY OF THE INVENTION

The present invention relates to compositions and processes for making the compositions into shaped articles which can be hardened at low temperatures, 150° to 200° C., to give excellent physical and mechanical properties resembling high-temperature fired ceramics in many ways.

The present invention provides new composite material compositions comprising, on a dry basis, an intimate mixture of finely divided ceramic and resin powders.

This invention also provides casting slip and modeling clay compositions which have excellent working properties and are capable of being fired at temperatures available in household kitchen ovens. These fired objects possess high strength, high impact resistance, and unusually high resistance to attack by moisture when cycled in a dishwasher or when immersed in boiling water.

The rigid ceramic/resin composite wares can be coated with air dried or low fired glazes or stains (aqueous and nonaqueous). The coatings exhibit a high degree of adherence and permanency.

DETAILED DESCRIPTION OF THE INVENTION

The compositions of this invention comprise finely divided ceramic powders and a finely divided, powdered, low-melt viscosity, epoxy resin system comprising:

(a) Epoxy resins which are well known and are noted generally to consist of the reaction products if bisphenol-A and epichlorohydrin, the reaction being carried out under alkaline conditions. In general, epoxy resins having a Durrans' mercury method melting point in the range of 60° to 135° C., and an epoxide equivalent weight between about 450 and 2500 are useful in the present invention. Examples of typical epoxy resins are those available from Celanese Corporation as "Epi-Rez" 522-C and from Shell Chemical Company under the designation "Epon 1001," "Epon 1002," "Epon 1004" and "Epon 1007." The primary difference among these "Epon" resins is that melting point and epoxide equivalent weight increases as the identifying number increases. Thus, "Epon 1001" has an epoxy equivalent weight of 450–550. It has a Durrans' mercury method melting point of 65°–75° C. "Epon 1002" has an epoxide equivalent weight of 600–700 and a Durrans' mercury method melting range of 75°–85° C. "Epon 1004" has an epoxide equivalent weight of 875–1025 and a Durrans' mercury method melting point of 95°–105° C. These epoxy resins, sometimes considered resinous polyethers, have more than one 1,2-epoxy group

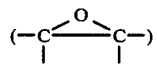

per average molecular weight of resin. Analogous results of this invention may be obtained with other normally-solid epoxy resins as produced by the reaction of epichlorohydrin or equivalent 1,2-epoxy compound with polyhydric phenols or other polyhydric compounds such as polyhydric alcohols. Also, epoxy resins may be produced by epoxidizing double bonds of unsaturated hydrocarbons, as is well known. In all cases, the epoxy resin has, on the average, more than one 1,2-epoxy linkage or oxirane oxygen group per molecule. Reference is also made to Lee and Neville, *Handbook of Epoxy Resins*, McGraw Hill Book Company, 1967, pages 4-59 to 4-69, for other epoxy resins having the abovenoted characteristics.

(b) Solid latent curing agent for epoxy resins which are unaffected by aqueous systems and are sufficiently active as a curing agent to cure the epoxy resin in the temperature range of 150° C. to 200° C. They should be stable in an aqueous media over long periods of time after the composite material composition has been prepared into a slip or modeling clay. Typical of these are nonpolymeric amides such as dicyandiamide and amine epoxy adducts. The amount required to cure the epoxide resin is about 0.75 to 1.5 active hydrogen equivalent weight per epoxide equivalent weight of the epoxide resin.

The epoxy resin system may also contain a latent catalyst for accelerating reaction between the epoxy resin and curing agent and which is unaffected by aqueous systems such as a tertiary amine (up to about 1 weight percent).

The components of the above resin system are homogeneously mixed into a one-part system by various mixing procedures such as a two-roll rubber mill, one roll of which is heated by steam to about 45° C. while the other is maintained at ambient temperatures. The mixing time is about 10 to 20 minutes after which the homogeneous mixture is sheeted off, allowed to cool to room temperature, and ground to a fine powder which is sieved through U.S. No. 80 mesh screen (177 micron particles). The mixing procedure employed is nothing more than a superficial fusing together of the solid particles into a one-part system. Other mixing procedures such as extrusion or dry blending can be employed.

The ceramic powders utilized in the present invention are finely divided and generally range in particle size from 0.6 micron to 177 microns (U.S. 80 mesh).

The ceramic powder-epoxy resin system can be shaped into any desired configuration using standard ceramic processing methods because the resin system is present in the ceramic-epoxy resin system as discrete particles which do not interfere with the working characteristics of the ceramic powder. For example, the slip compositions can be slip cast and fired in a home oven which provides a means for an amateur to produce ceramic-like articles such as vases, flower pots, etc. Such articles have high strength, high impact resistance, and unusually high resistance to attack by water when cycled in a dishwasher. Tests have shown that impact resistance of such articles is about 30% greater than similar articles made of clay/talc hobby ceramic slips fired at about 1000° C. Articles made of compositions of this invention and coated with commercially available nonfire glazes have excellent resistance to moisture attacks. For example, these coated articles can be cycled for several times in a dishwasher before the coating begins to spall off. Articles made of high fire ceramics, when coated and tested under similar conditions, begin losing their coating during the first cycle.

The epoxy resin powder in Examples 1-13 included 100 parts of diglycidyl ether of bisphenol-A having an epoxide equivalent weight range of 550-650 and a Durrans' melting point of 75°-85° C. (Epi-Rez 522-C of Celanese Corporation), 5 parts of dicyandiamide, and 0.29 parts of DMP-30 tertiary amine. These components were homogeneously mixed into a one-part system using a two-roll rubber mill, one roll of which was heated by steam to about 45° C. while the other was maintained at ambient temperature. The mixing time was 10 minutes after which the mixture was sheeted off, allowed to cool to room temperature, and ground to a fine powder which was sieved through No. 80 mesh screen (U.S.) having 180 micrometer openings. This material was then mixed with 0.25 parts of colloidal silica (CAB-O-SIL) to form a homogeneous free-flowing powder.

The following specific examples are intended to illustrate more clearly the nature of the present invention.

EXAMPLE 1

Slip Preparation

The following dry components are made into a slip in the manner described hereinbelow.

| Component | Average Particle Size (Microns) | Specific Gravity | Percent Wt. | Vol. |
|---|---|---|---|---|
| Kentucky Ball Clay #4 | 0.6 | 2.50 | 41.3 | 41.0 |
| Steawhite 200 Talc | 7.0 | 2.75 | 45.4 | 41.0 |
| Columbia-325 Mesh Supersil Silica | 11.0 | 2.65 | 8.3 | 7.7 |
| Epoxy Resin Powder | (1) | 1.2 | 5.0 | 10.3 |
| | | | 100.0 | 100.0 |

(1) 100% finer than 177 microns (U.S 80 mesh) 60-75% finer than 44 microns (U.S. 325 mesh)

1785 g. of tap water is intimately mixed for 20 minutes with 2.17 g. of sodium carbonate and 9.45 g. of sodium silicate solution N brand (8.9 weight percent Na$_2$O; 28.7 weight percent SiO$_2$; 62.4 weight percent water) in a 1-gallon stainless steel beaker in which is immersed a jiffy stirrer attached to an air motor which operates at about 700 rpm. 1446 g. of Kentucky Ball Clay #4 is slowly added to the aforementioned aqueous solution. 1590 g. of talc Steawhite 200 is slowly added followed by the addition of a preblended mixture of 289 g. of silica Supersil and 175 g. of epoxy powder. Total mixing time to this point is one hour. Running of the jiffy stirrer is continued for two hours to achieve thorough mixing. When the mixing is finished, the slip is poured into a 1-gallon plastic container which is then sealed and allowed to age at least 24 hours before testing and forming shaped bodies by slip casting with Plaster of Paris molds.

Slip Casting

1. Fifty bars are cast by pouring slip into two-part Plaster of Paris molds containing cavities measuring about 0.635 × 1.27 × 6.35 cm. The casting time is 45 minutes. The rubber bands are removed and molds opened. The bars remain in the mold cavities for 5 minutes before removal. Mold release property is noted and recorded.

2. Tiles are cast by pouring slip into a two-part Plaster of Paris mold containing cavities measuring about 10 × 10 × 0.635 cm. The casting time is 45 minutes. The top plate containing slip pouring holes is removed and tiles remain in the mold cavities for 5 minutes before removal. Mold release property is noted and recorded. Wet weights and the dimensions are recorded. The tiles are air-dried for at least 48 hours before obtaining dry weights and dimensions.

3. A vase is cast by pouring slip into a two-part Plaster of Paris mold. The casting time is 15 minutes; the mold is then drained by inverting it to pour out the slip remaining in the mold. The drainage time is 5 minutes. The rubber band is removed and mold opened. The vase remains in the mold cavity for about 5 minutes before removal. Mold release property is noted and recorded. Wet weight is recorded and after at least 48 hours the dry weight and wall thickness is recorded.

Firing

Fifty bars are air dried at least 48 hours before firing in a Blue M Electric Co. (Blue Island, Ill.) air circulating oven (Model No. POM-880G-IX-Temp. 704° C. maximum).

The dried bars are divided into five groups, ten bars each, in which each group is placed on setters and fired at the conditions described below:

| Group Number | | Firing Condition | |
|---|---|---|---|
| | | Preheat | Soak |
| 1 | Refractory setter plate (1.6 × 12.7 × 30.5 cm.) covered with a layer of alumina setter sand | 100° C. 1 hour | 150° C. 1 hour |
| 2 | " | 100° C. 1 hour | 175° C. 1 hour |
| 3 | " | 100° C. 1 hour | 200° C. 1 hour |
| 4 | " | 100° C. 1 hour | 175° C. 16 hours |
| 5 | Tin-coated steel (14.3 × 20.3 × .03 cm.) | 100° C. 1 hour | 175° C. 5 hours |

The tiles are divided into two groups, three tiles each. One group is fired at the condition described for Group No. 2, above, and the other group is fired on a tin-coated steel sheet at the same preheat and soak conditions described for Group No. 2, above.

Testing

The following tests were conducted:

1. Slip Tests

A. The density measurements are made by carefully weighing 250 cc. of slip, recording the weight, and calculating the density.

B. Viscosity is determined by utilizing a Brookfield viscometer (LVT model with helipath stand at 12 rpm).

C. pH is determined by utilizing a Corning digital 109 general purpose pH meter.

2. Casting Tests

A. The water of plasticity is calculated as a percentage of the weight of the dry shapes by the following formula:

$$T = \frac{Wp - Wd}{Wd} \times 100$$

in which
T = Percent water of plasticity
Wp = Weight of the plastic piece
Wd = Weight of the dry piece B. Shrinkage of the tile is calculated by:

$$\% \text{ cast shrinkage} = \frac{\text{inside mold cavity length} - \text{plastic tile length}}{\text{inside mold cavity length}} \times 100$$

$$\% \text{ dry shrinkage} = \frac{\text{plastic tile length} - \text{dry tile length}}{\text{plastic tile length}} \times 100$$

$$\% \text{ total linear shrinkage} = \frac{\text{inside mold cavity length} - \text{dry tile length}}{\text{inside mold cavity length}} \times 100$$

3. Firing Tests

A. Bulk density — Bars are weighed and measured and bulk densities calculated.

B. Shrinkage — The tiles are measured and percentage linear shrinkage calculated according to the following formula:

$$\% \text{ linear shrinkage} = \frac{\text{Dry length} - \text{Fired length}}{\text{Dry length}} \times 100$$

The average of the values is reported.

C. Flexural Strength — The bars are broken on an Instron Compression Tester equipped with a suitable sample holder with knife edges 0.6 cm. radius and 2.5 cm. apart. The machine operates with a 453.6 kg. load cell and at a crosshead speed of 0.5 cm. per minute. The break load at which the specimen fails is recorded and thickness and width of each bar at the break is measured. The flexural strength is calculated by:

Flexural Strength = $3PL/2bd^2$ where
P = the breaking load
L = the distance between knife edges
b = width of bar
d = depth of bar The average results for each group of bars fired under conditions previously described are reported.

4. Test results of the example are shown below:

| Test | Results |
|---|---|
| SLIP | |
| Density —g/cc | 1.64 |
| Viscosity —cps | 1930 |
| pH | 7.3 |
| CASTING | |
| Release from molds | |
| Bars | Excellent |
| Tiles | Excellent |
| Vases | Excellent |
| Drainage | |
| Vases | Excellent |
| Casting Rate | |
| Vases(wall thickness) | 3.2 amm |
| Water of Plasticity (%) | |
| Tiles | 26.0 |
| Vases | 28.4 |
| Shrinkage of Tile (%) | |
| Cast | 1.8 |
| Dry | 5.0 |
| Total | 6.8 |
| FIRING | |
| Bulk density — g/cc | 1.75 |
| Shrinkage — % | .27 |
| Flexural strength — Newtons/mm² | |
| Refractory Setter | |
| 150° C. — 1 hr. | 4.62 |
| 175° C. — 1 hr. | 4.83 |
| 200° C. — 1 hr. | 6.21 |
| 175° C. — 16 hrs. | 7.93 |
| Steel Setter | |
| 175° C. — 1 hr. | — |
| 175° C. — 5 hrs. | 9.31 |

EXAMPLES 2–7

In these examples, slip compositions with the indicated components were formulated according to the procedure of Example 1, and were also tested in the manner set forth in Example 1.

TEST RESULTS

| DESCRIPTION | EXAMPLE 2 | 3 | 4 | 5 | 6 | 7 |
|---|---|---|---|---|---|---|
| SLIP | | | | | | |
| Density — g/cc | 1.63 | 1.57 | 1.53 | 1.50 | 1.47 | 1.43 |
| Viscosity — cps | 1500 | 2100 | 1500 | 2450 | 1925 | 2300 |
| pH | 7.5 | 7.5 | 7.5 | 7.8 | 7.9 | 8.0 |
| CASTING | | | | | | |
| Release From Molds | | | | | | |
| . Bars | Excellent | Excellent | Excellent | Good | Fair | V. Poor |
| . Tiles | " | " | " | " | Poor - cracked | Did not cast |
| . Vases | " | " | " | " | Poor - some cracking | " |
| Drainage | | | | | | |
| . Vases | Excellent | Excellent | Excellent | Excellent | Excellent | — |
| Casting Rate | | | | | | |
| . Vases (wall thick, mm) | 3.1 mm | 3.0 mm | 3.4 mm | 3.9 mm | 4.1 mm | — |
| Water of Plasticity (%) | | | | | | |
| . Tiles | — | 23.5 | 25.4 | 25.1 | — | — |
| . Vases | 27.2 | 24.4 | 25.9 | 26.4 | 26.4 | — |
| Shrinkage of Tile (%) | | | | | | |
| . Cast | 1.8 | 1.6 | 1.5 | 1.7 | cracked | — |
| . Dry | 4.5 | 4.1 | — | 3.4 | cracked | — |
| Total | 6.2 | 5.7 | — | 5.1 | cracked | — |
| FIRING | | | | | | |
| Bulk Density — g/cc | 1.74 | 1.63 | 1.54 | 1.44 | 1.37 | 1.26 |
| Shrinkage — % | .10 | .14 | — | .16 | — | — |
| Flexural Strength Newtons/mm² | | | | | | |
| . Refractory Setter | | | | | | |
| 150° C. — 1 hr. | — | 18.3 | — | 26.0 | 23.1 | 24.3 |
| 175° C. — 1 hr. | — | 20.5 | — | 28.3 | 25.5 | 25.5 |
| 200° C. — 1 hr. | — | 24.1 | — | 29.7 | 27.4 | — |
| 175° C. — 16 hrs. | 14.71 | 25.9 | 36.5 | 34.8 | 36.5 | — |
| . Steel Setter | | | | | | |
| 175° C. — 1 hr. | 10.2 | — | 31.4 | cracked | cracked | — |
| 175° C. — 5 hrs. | 11.7 | 30.7 | 35.0 | cracked | cracked | — |

DRY BATCH COMPOSITIONS — PERCENT

| | EXAMPLES | | | | | | | | | | | |
|---|---|---|---|---|---|---|---|---|---|---|---|---|
| | 2 | | 3 | | 4 | | 5 | | 6 | | 7 | |
| MATERIAL | WT. | VOL. | WT. | VOL. | WT. | VOL. | WT. | VOL. | WT. | VOL. | WT. | VOL. |
| CERAMIC | | | | | | | | | | | | |
| Kentucky Ball Clay #4 | 40.7 | 39.6 | 37.0 | 33.0 | 34.8 | 29.5 | 32.6 | 26.4 | 30.4 | 23.6 | 28.3 | 21.0 |
| Talc Steawhite 200 | 44.7 | 39.7 | 40.6 | 33.0 | 38.3 | 29.5 | 35.9 | 26.4 | 33.5 | 23.6 | 31.1 | 21.0 |
| Silica Supersil | 8.1 | 7.5 | 7.4 | 6.2 | 6.9 | 5.6 | 6.5 | 5.0 | 6.1 | 4.4 | 5.6 | 4.0 |
| | 93.5 | 86.8 | 85.0 | 72.2 | 80.0 | 64.6 | 75.0 | 57.8 | 70.0 | 51.6 | 65.0 | 46.0 |
| Polymer | | | | | | | | | | | | |
| Epoxy Powder | 6.5 | 13.2 | 15.0 | 27.8 | 20.0 | 35.4 | 25.0 | 42.2 | 30.0 | 48.4 | 35.0 | 54.0 |
| TOTAL | 100.0 | 100.0 | 100.0 | 100.0 | 100.0 | 100.0 | 100.0 | 100.0 | 100.0 | 100.0 | 100.0 | 100.0 |

SLIP COMPOSITIONS — PERCENT

| | EXAMPLES | | | | | | | | | | | |
|---|---|---|---|---|---|---|---|---|---|---|---|---|
| | 2 | | 3 | | 4 | | 5 | | 6 | | 7 | |
| MATERIAL | Wt. | VOL. | WT. | VOL. | WT. | VOL. | WT. | VOL. | WT. | VOL. | WT. | VOL. |
| CERAMIC | | | | | | | | | | | | |
| Kentucky Ball Clay #4 | 26.86 | 17.6 | 24.4 | 15.4 | 23.15 | 14.3 | 21.7 | 13.1 | 20.26 | 11.9 | 18.81 | 10.9 |
| Talc Steawhite 200 | 29.55 | 17.6 | 26.9 | 15.4 | 25.46 | 14.3 | 28.87 | 13.1 | 22.28 | 11.9 | 20.69 | 10.9 |
| Silica Supersil | 5.38 | 3.3 | 4.9 | 2.9 | 4.63 | 2.7 | 4.34 | 2.5 | 4.95 | 2.3 | 3.77 | 2.0 |
| | 61.79 | 38.5 | 56.2 | 33.7 | 53.24 | 31.3 | 49.91 | 28.7 | 46.59 | 26.1 | 43.27 | 23.8 |
| POLYMER | | | | | | | | | | | | |
| Epoxy Powder | 4.30 | 5.9 | 9.9 | 13.0 | 13.31 | 17.1 | 16.64 | 20.9 | 19.97 | 24.6 | 23.30 | 28.0 |
| AQUEOUS SOLUTION | | | | | | | | | | | | |
| Sodium Carbonate | .04 | | .04 | | .03 | | .03 | | .03 | | .03 | |
| Sodium Silicate (N) | .17 | | .16 | | .15 | | .14 | | .13 | | .12 | |
| Water | 33.70 | | 33.7 | | 33.27 | | 33.28 | | 33.28 | | 33.28 | |
| | 33.91 | 55.6 | 33.90 | 53.3 | 33.45 | 51.6 | 33.45 | 50.4 | 33.44 | 49.3 | 33.43 | 48.2 |
| | 100.0 | 100.0 | 100.0 | 100.0 | 100.0 | 100.0 | 100.0 | 100.0 | 100.0 | 100.0 | 100.0 | 100.0 |

EXAMPLE 8

This example illustrates a preferred slip composition formulated according to the procedure of Example 1, and also tested in the manner set forth in Example 1.

| | Slip Composition | | Dry Batch | |
|---|---|---|---|---|
| Material | Parts by Weight-Grams | Volume % | Weight % | Volume % |
| Ceramic | | | | |
| Kentucky Ball Clay #4 | 1400 | 17.18 | 40 | 38.35 |
| Talc Steawhite 200 | 1540 | 17.19 | 44 | 38.39 |
| Silica Supersil | 280 | 3.25 | 8 | 7.25 |
| Polymer | | | | |
| Epoxy Powder | 280 | 7.17 | 8 | 16.01 |
| Aqueous Solution | | | | |
| Sodium Carbonate | 2.10 | | | |
| Sodium Silicate (N) | 9.10 | | | |
| Water | 1785 | 55.21 | | |
| TOTAL | 5296.2 | 100.00 | 100.00 | 100.00 |

A slip made from this example is aged for six weeks and tested in the manner set forth in Example 1. Test results are shown in comparison to the freshly prepared slip.

| Test | Test Results | |
|---|---|---|
| | Fresh Slip | 6-Week Age |
| SLIP | | |
| Density — g/cc | 1.63 | 1.63 |
| Viscosity | 2200 | 2390 |
| pH | 7.5 | 7.5 |
| CAST | | |
| Release from molds-bars, tiles | Excellent | Excellent |
| Drainage — vases | Excellent | Excellent |
| Casting rate | | |
| Vases (wall thick., mm) | 3.4 | 3.2 |
| Water of plasticity (%) | | |
| Vases | 27.6 | Not measured |
| Tiles | 28.2 | |
| Shrinkage of Tile (%) | | |
| Cast | 1.9 | Not measured |
| Dry | 4.9 | |
| Total | 6.8 | |
| FIRING | | |
| Steel Setter Plate | | |
| Bulk density — g/cc | 1.71 | 1.71 |
| Flexural strength | | |
| 175° C. — 1 hr. Newtons/mm$^2$ | 20 | 20 |
| 175° C. — 5 hrs. Newtons/mm$^2$ | Not measured | 23.4 |

One tile each of this Example which had been fired at 175° C. for one hour was coated with the following Duncan nonfired Bisq-Stain materials (Duncan Ceramic Products); (1) Black OS476; (2) lemon pale OS434; (3) holy red OS455; and (4) bright blue OS459. Commercial ceramic tile which had been fired at cone 06 (1023° C.) was coated with the same materials. After air drying for 24 hours, the tiles were placed in a laboratory dishwasher. Temperatures rose to about 85° C. within the washer and the water blast was vigorous. After one cycle, the coatings and tiles were observed. The coatings applied to the tile of this Example showed no evidence of spalling whereas the coating on the cone 06 ceramic tile had been removed. The tile material was unaffected in both cases.

A small flower pot was cast using the slip made by the composition and procedure of this Example. After air drying and firing at 175° C. for one hour, this flower pot was filled with tap water and covered with a plate glass which was sealed to the top of this pot with a silicone rubber adhesive (Dow Corning RTV735 silastic sealant). A ceramic flower pot was made from this same mold using a commercial slip supplied by Ex-Cel, Inc. After drying and firing this pot at cone 05 (1062° C.) it was filled with tap water and covered and sealed in the manner described above. The cone 05 ceramic pot was dry after three days, whereas the pot made of the material of this Example had some water remaining at the end of two months.

EXAMPLE 9

This Example illustrates a slip composition containing a finely divided epoxy powder made according to the procedure of Example 1.

| Ceramic | Slip Composition | | Dry Batch Composition | |
|---|---|---|---|---|
| | Parts by Weight-grams | Volume % | Weight % | Volume % |
| Kentucky Ball Clay #4 | 313.00 | 16.67 | 39.13 | 36.75 |
| Talc Steawhite 200 | 344.3 | 16.67 | 43.03 | 36.75 |
| Silica Supersil | 62.7 | 3.14 | 7.84 | 6.95 |
| Polymer | | | | |
| —25 micron Epoxy Powder Aqueous solution | 80 | 8.88 | 10.00 | 19.55 |
| Sodium Carbonate | .47 | | | |
| Sodium Silicate (N) | 2.0 | | | |
| Water | 408 | 54.64 | | |
| Total | 1210.47 | 100.00 | 100.00 | 100.00 |

The slip is allowed to age 24 hours and specific gravity is 1.60 and viscosity about 1800 cps. Test bars are made by the procedure of Example 1. Casting properties are excellent. The bars are allowed to air dry for about 70 hours. Test bars of this Example are placed on tin-coated steel sheets and fired at 175° C.; one set of bars fired for one hour and the other set for 5 hours. The bars had a fired density of 1.66 g/cc. Flexural strength results are shown below:

| Firing Condition: | |
|---|---|
| 175° C. — 1 hour Newtons/mm$^2$ | 23.3 |
| 175° C. — 5 hours Newtons/mm$^2$ | 26.3 |

EXAMPLE 10

The following materials were thoroughly mixed by dry blending:

| Ingredients | Wt. % | Vol. % |
|---|---|---|
| White Earthenware Clay (Minn. Clay, Inc., Sp. gr. = 2.60) | 92 | 84.1 |
| Epoxy powder | 8 | 15.9 |
| | 100 | 100.0 |

26.4% by weight water is added to 100 parts by weight of dry ingredients and mixed to produce a plastic mixture suitable for throwing on a potter's wheel. A lump of modeling clay which has been hand wedged to remove the air is placed into the open area formed by laying two metal bars (45 cm. long × 2.5 cm. wide × 0.6 cm. thick) parallel to each other and spacing each end with a metal piece measuring 1.2 cm. wide × 0.6 cm. thick. After the ends are securely fastened, the clay is hand pressed and further compacted by rolling with a rolling pin. The excess clay remaining on the surface above the metal bars is cut off with a wire. The metal bars are removed and the strip of formed clay is cut into test bars measuring about 5 cm. The bars are allowed to dry at room temperature for at least 48 hours and then placed on tin-coated steel sheets and fired in a Blue M oven. Flexural strengths are measured by procedure of Example 1 and test results are:

| Firing Conditions | Flexural Strength Newtons/mm$^2$ |
|---|---|
| 175° C. for 1 hour | 15.2 |
| 200° C. for 1 hour | 17.2 |

A pottery shape was formed from the modeling clay of this Example. After drying for at least 48 hours, the shape was fired at 200° C. for one hour. The fired article was extremely hard and impervious to water.

EXAMPLES 11-13

In these Examples, modeling clay materials with the indicated components were formulated according by the procedure of Example 10, and were also tested in the manner there set forth. For comparison a modeling clay (S. C. Johnson & Son, Inc., Racine, Wis.) marketed under U.S. Pat. No. 3,817,897 is prepared per the procedure of Example 10 and fired concurrently with these Examples.

The fired clay/epoxy compositions (Examples 11-12) exhibited high impact resistance, a high degree of water impermeability, and a high degree of receptivity to commercial stains and paints.

EXAMPLE 14

An epoxy resin system formulated by dry blending as indicated below:

| Ingredients | Wt. % |
|---|---|
| EPOXIDE RESIN | |
| Epi-Rez 522-C [100% finer than 74 microns (U.S. 200 mesh)] | 77.2 |
| CURING AGENT | |
| EDA Adduct 870[(1)] [100% finer than 74 microns, H-Active equiv. Wt. is 185] | 22.8 |
| | 100.0 |

[(1)]Pacific Anchor Chemical Corporation is mixed at the 15% by weight level with 85% by weight of a White Earthenware Clay (Minnesota Clay, Inc.) 26.4% by weight water is added to 100 parts by weight of the aforementioned dry blend to form a modeling clay which is tested in the manner set forth in Example 10. Flexural test results are:

| Firing Conditions | Flexural Strength Newtons/mm$^2$ |
|---|---|
| 175° C. for 1 hour | 17 |
| 200° C. for 1 hour | 21 |

These data are a quantitative measure of the strength of the modeling clay composition. This clay composition is found to have high impact resistance, is impervious to water, and exhibits good adhesive properties for a variety of commercial paints, stains, and low temperature enamels.

| | MODELING CLAY COMPOSITIONS - (PERCENT) | | | | | | |
|---|---|---|---|---|---|---|---|
| | 11 | | 12 | | 13 | | U.S. Pat. No. |
| | Wt. | Vol. | Wt. | Vol. | Wt. | Vol. | 3,817,897 |
| SOLIDS | | | | | | | |
| Ceramic — White Earthenware Clay (Minnesota Clay, Inc.) | 71.2 | 49.9 | 67.2 | 45.6 | 63.3 | 41.7 | |
| POLYMER | | | | | | | |
| Epoxy Powder | 7.9 | 12.0 | 11.9 | 17.5 | 15.8 | 22.5 | |
| | 79.1 | 61.9 | 79.1 | 63.1 | 79.1 | 64.2 | |
| AQUEOUS PHASE | | | | | | | |
| Water | 20.9 | 38.1 | 20.9 | 36.9 | 20.9 | 35.8 | |
| | 100.0 | 100.0 | 100.0 | 100.0 | 100.0 | 100.0 | |
| FLEXURAL STRENGTHS (Newtons/mm$^2$) | | | | | | | |
| 175° C. — 1 hour | 16.5 | 20 | 16.7* | | | | 12.0 |
| 200° C. — 1 hour | 21 | 25 | 19.2* | | | | 14.0 |

*Hairline cracks formed

What is claimed is:

1. A casting and modeling composition comprising from about 15 to 35 weight percent of aqueous phase and from about 65 to 85 weight percent of solids phase and together totalling 100%, said solids phase consisting essentially of a free flowing blend of
   from 75 to 95 weight percent of finely divided clay-talc ceramic powders of less than U.S. 80 mesh size and
   from 5 to 25 weight percent of free-flowing finely divided homogeneous epoxy resin system of less than U.S. 80 mesh size comprising
      epoxy resin having Durrans' melting point of about 60° to 135° C. and epoxy equivalent of about 450 to 2500,
      solid latent curing agent active for curing said epoxy resin at temperatures above about 150° C. in an amount of about 0.75 to 1.5 active hydrogen equivalent weight per epoxide equivalent of said epoxy resin and
      finely divided silica.

2. Casting and modeling composition according to claim 1 wherein the homogeneous-epoxy resin system additionally includes solid latent acceleration catalyst.

3. Casting and modeling composition according to claim 1 wherein the epoxy resin has an epoxide equivalent of 550–650 and Durrans' melting point of 75° to 85° C.

4. Casting and modeling composition according to claim 3 wherein for 100 parts by weight of epoxy resin there are about 5 parts by weight of solid latent curing agent and about 0.29 parts by weight of amine-type, heat-activatable latent acceleration catalyst.

* * * * *